US010708520B2

(12) United States Patent
Lee (10) Patent No.: US 10,708,520 B2
(45) Date of Patent: Jul. 7, 2020

(54) CALIBRATION METHOD OF AN IMAGE DEVICE AND RELATED IMAGE DEVICE AND OPERATIONAL DEVICE THEREOF

(71) Applicant: eYs3D Microelectronics, Co., Taipei (TW)

(72) Inventor: Chi-Feng Lee, Hsinchu County (TW)

(73) Assignee: eYs3D Microelectronics, Co., Taipei (TW)

( * ) Notice: Subject to any disclaimer, the term of this patent is extended or adjusted under 35 U.S.C. 154(b) by 0 days.

(21) Appl. No.: 16/432,935

(22) Filed: Jun. 6, 2019

(65) Prior Publication Data

US 2019/0378301 A1     Dec. 12, 2019

Related U.S. Application Data

(60) Provisional application No. 62/681,683, filed on Jun. 7, 2018.

(51) Int. Cl.
*H04N 5/00* (2011.01)
*H04N 5/262* (2006.01)
(Continued)

(52) U.S. Cl.
CPC ........... *H04N 5/2628* (2013.01); *G06T 5/002* (2013.01); *G06T 7/85* (2017.01); *G06T 7/97* (2017.01);
(Continued)

(58) Field of Classification Search
CPC .... H04N 5/2628; H04N 13/204; H04N 13/15; H04N 13/254; H04N 13/296;
(Continued)

(56) References Cited

U.S. PATENT DOCUMENTS 6,137,491 A * 10/2000 Szeliski ................ G06K 9/209
345/419
2010/0194886 A1* 8/2010 Asari ....................... G06T 7/85
348/148
(Continued)

FOREIGN PATENT DOCUMENTS

CN    103729883 A    4/2014
CN    106416240 A    2/2017
(Continued)

*Primary Examiner* — Zhihan Zhou
(74) *Attorney, Agent, or Firm* — Winston Hsu (57) ABSTRACT

A calibration method of an image device includes at least two image capturing units included in the image device capturing at least two corresponding images; a processor executing distortion correction on the at least two corresponding images, extracting a plurality of feature points of a predetermined number of planes of an object from the at least two corresponding images, classifying the plurality of feature points according to each plane of the predetermined number of planes to accordingly calculate a point-to-point homography matrix corresponding to the each plane respectively to generate a rotation/translation matrix corresponding to the at least two image capturing units, generating a final rotation matrix corresponding to each image capturing unit of the at least two image capturing units according to the rotation/translation matrix, storing the final rotation matrix in a memory, and calibrating the each image capturing unit according to the final rotation matrix.

20 Claims, 7 Drawing Sheets

(51) Int. Cl.

| | | |
|---|---|---|
| *G06T 7/80* | (2017.01) | |
| *G06T 7/00* | (2017.01) | |
| *H04N 13/204* | (2018.01) | |
| *G06T 5/00* | (2006.01) | |
| *H04N 17/00* | (2006.01) | |
| *H04N 13/15* | (2018.01) | |
| *H04N 13/254* | (2018.01) | |
| *H04N 13/296* | (2018.01) | |
| *H04N 13/239* | (2018.01) | |
| *H04N 13/161* | (2018.01) | |
| *H04N 5/232* | (2006.01) | |

(52) U.S. Cl.
CPC ......... *H04N 5/23238* (2013.01); *H04N 13/15* (2018.05); *H04N 13/161* (2018.05); *H04N 13/204* (2018.05); *H04N 13/239* (2018.05); *H04N 13/254* (2018.05); *H04N 13/296* (2018.05); *H04N 17/002* (2013.01); *H04N 2201/3254* (2013.01); *H04N 2201/3277* (2013.01)

(58) Field of Classification Search
CPC ............... H04N 13/239; H04N 13/161; H04N 5/23238; H04N 17/002; H04N 2201/3254; H04N 2201/3277; G06T 7/85; G06T 7/97; G06T 5/002
See application file for complete search history.

(56) References Cited

U.S. PATENT DOCUMENTS

| | | | |
|---|---|---|---|
| 2010/0295948 A1* | 11/2010 | Xie | G06T 7/80 348/175 |
| 2011/0317988 A1 | 12/2011 | Lee | |
| 2012/0274739 A1* | 11/2012 | Li | H04N 5/2624 348/36 |
| 2013/0077882 A1 | 3/2013 | Venkataraman | |
| 2014/0225985 A1 | 8/2014 | Klusza | |
| 2015/0213607 A1* | 7/2015 | Jeong | G06T 7/97 345/427 |
| 2015/0314443 A1* | 11/2015 | Yu | G06T 7/73 701/28 |
| 2016/0029009 A1 | 1/2016 | Lu | |
| 2016/0291594 A1 | 10/2016 | Zhao | |
| 2017/0010452 A1 | 1/2017 | Patzwald | |
| 2017/0161561 A1 | 6/2017 | Marty | |
| 2018/0061021 A1* | 3/2018 | Lin | G06T 5/006 |
| 2018/0278916 A1 | 9/2018 | Kim | |
| 2019/0259178 A1* | 8/2019 | Hafner | G06T 7/248 |

FOREIGN PATENT DOCUMENTS

| | | |
|---|---|---|
| CN | 106576160 A | 4/2017 |
| CN | 107167996 A | 9/2017 |
| TW | 201447228 A | 12/2014 |
| TW | 201733350 A | 9/2017 |

* cited by examiner

CALIBRATION METHOD OF AN IMAGE DEVICE AND RELATED IMAGE DEVICE AND OPERATIONAL DEVICE THEREOF

CROSS REFERENCE TO RELATED APPLICATIONS

This application claims the benefit of U.S. Provisional Application No. 62/681,683, filed on Jun. 7, 2018 and entitled "IMAGE PROCESSING METHOD AND SELF-CALIBRATION/LIGHT CONTROL METHOD FOR CAMERA DEVICE," the contents of which are incorporated herein by reference.

BACKGROUND OF THE INVENTION

1. Field of the Invention

The present invention relates to a calibration method of an image device and a related image device and an operational device thereof, and particularly to a calibration method and a related image device and an operational device thereof that can utilize feature points of at least one plane of an object from corresponding images captured by image capturing units of an image device to calibrate the image device.

2. Description of the Prior Art

After an image device is shipped and the image device operates for a period of time, a mechanism between a left eye image capturing unit and a right eye image capturing unit of the image device may be shifted due to a usage environment, a usage way, or a usage condition of the image device, resulting in mechanism and optical accuracy of the image device being reduced. Therefore, a calibration method provided by the prior art utilizes feature points of corresponding images captured by the left eye image capturing unit and the right eye image capturing unit to calculate a fundamental (essential) matrix, and then utilizes the fundamental matrix to calibrate a shift of the mechanism between the left eye image capturing unit and the right eye image capturing unit. For example, the fundamental matrix can calibrate a relative rotation angle between the left eye image capturing unit and the right eye image capturing unit, a relative skew between the left eye image capturing unit and the right eye image capturing unit, and so on.

However, the calibration method provided by the prior art only can execute robust calibration on the left eye image capturing unit and the right eye image capturing unit at least according to multiple distances (i.e. multiple depths corresponding to the object) between multiple feature points of the object and the image device in the space. Therefore, if differences between the multiple distances are smaller (e.g. the object is flat and parallel to a projective plane, so the differences between the multiple distances are smaller), a calibration result may not be accepted by a user of the image device. That is, the calibration result is weak calibration called by one of ordinary skill in the art. Therefore, how to provide a calibration method which can generate a well calibration result becomes an important issue.

SUMMARY OF THE INVENTION

An embodiment of the present invention provides a calibration method of an image device, wherein the image device includes at least two image capturing units. The calibration method includes the at least two image capturing units capturing at least two corresponding images; a processor executing distortion correction on the at least two corresponding images; the processor extracting a plurality of feature points of a predetermined number of planes of an object from the at least two corresponding images; the processor classifying the plurality of feature points according to each plane of the predetermined number of planes to accordingly calculate a point-to-point homography matrix corresponding to the each plane respectively to generate a rotation/translation matrix corresponding to the at least two image capturing units; the processor generating a final rotation matrix corresponding to each image capturing unit of the at least two image capturing units according to the rotation/translation matrix; and the processor storing the final rotation matrix in a memory and calibrating the each image capturing unit according to the final rotation matrix.

Another embodiment of the present invention provides an image device with calibration function. The image device includes at least two image capturing units and a processor. The at least two image capturing units are used for capturing at least two corresponding images. The processor is used for executing distortion correction on the at least two corresponding images, extracting a plurality of feature points of a predetermined number of planes of an object from the at least two corresponding images, classifying the plurality of feature points according to each plane of the predetermined number of planes to accordingly calculate a point-to-point homography matrix corresponding to the each plane respectively to generate a rotation/translation matrix corresponding to the at least two image capturing units, generating a final rotation matrix corresponding to each image capturing unit of the at least two image capturing units according to the rotation/translation matrix, and calibrating the each image capturing unit according to the final rotation matrix.

Another embodiment of the present invention provides an operational device with calibration function. The operational device includes a processor. The processor is used for executing distortion correction on at least two corresponding images captured by an image device, extracting a plurality of feature points of a predetermined number of planes of an object from the at least two corresponding images, classifying the plurality of feature points according to each plane of the predetermined number of planes to accordingly calculate a point-to-point homography matrix corresponding to the each plane respectively to generate a rotation/translation matrix corresponding to the at least two image capturing units, generating a final rotation matrix corresponding to each image capturing unit of the at least two image capturing units according to the rotation/translation matrix, and calibrating the each image capturing unit according to the final rotation matrix.

Another embodiment of the present invention provides an image device with calibration function. The image device includes at least two image capturing units and a processor. The at least two image capturing units are used for capturing at least two corresponding images, wherein relative positions between the at least two image capturing units are changeable to make the at least two corresponding images be used for generating a 360 degree panorama image, or at least one depth map, or at least one stereo image. When the at least two corresponding images are used for generating the at least one depth map or the at least one stereo image, the processor executes distortion correction on the at least two corresponding images, extracts a plurality of feature points of a predetermined number of planes of an object from the at least two corresponding images, classifies the plurality of feature points according to each plane of the predetermined number of planes to accordingly calculate a point-to-point homography matrix corresponding to the each plane respectively to generate a rotation/translation matrix corresponding to the at least two image capturing units, generates a final rotation matrix corresponding to each image capturing unit of the at least two image capturing units according to the rotation/translation matrix, and calibrates the each image capturing unit according to the final rotation matrix.

The present invention provides a calibration method of an image device and a related image device and an operational device thereof. The calibration method, the image device, and the operational device thereof utilize a processor to extract a plurality of feature points of a predetermined number of planes of an object from corresponding images captured by image capturing units of the image device, and utilize the processor to classify the plurality of feature points according to each plane of the predetermined number of planes to calibrate the image device, so the present invention is different from a method of the prior art directly utilizing multiple feature points of the object (that is, not classifying the multiple feature points) to calibrate the image device. Therefore, compared to the prior art, even if differences between multiple distances between the multiple feature points and the image device are smaller, the present invention can still execute robust calibration on the image capturing units of the image device to generate a well calibration result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
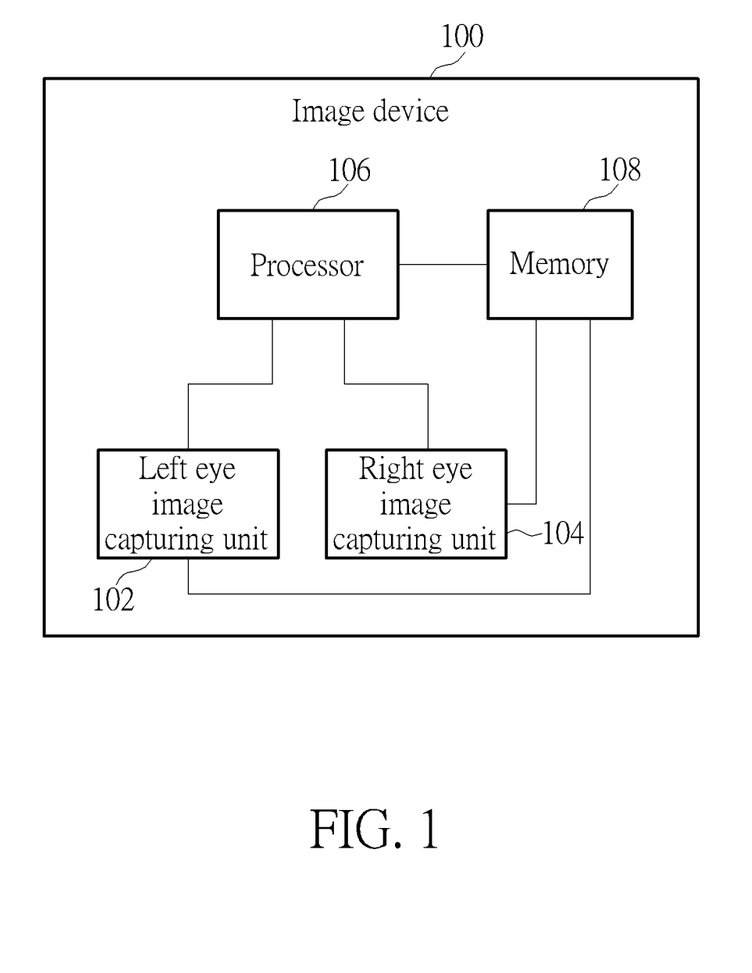
FIG. 1 is a diagram illustrating an image device according to a first embodiment of the present invention.
Figure 2:
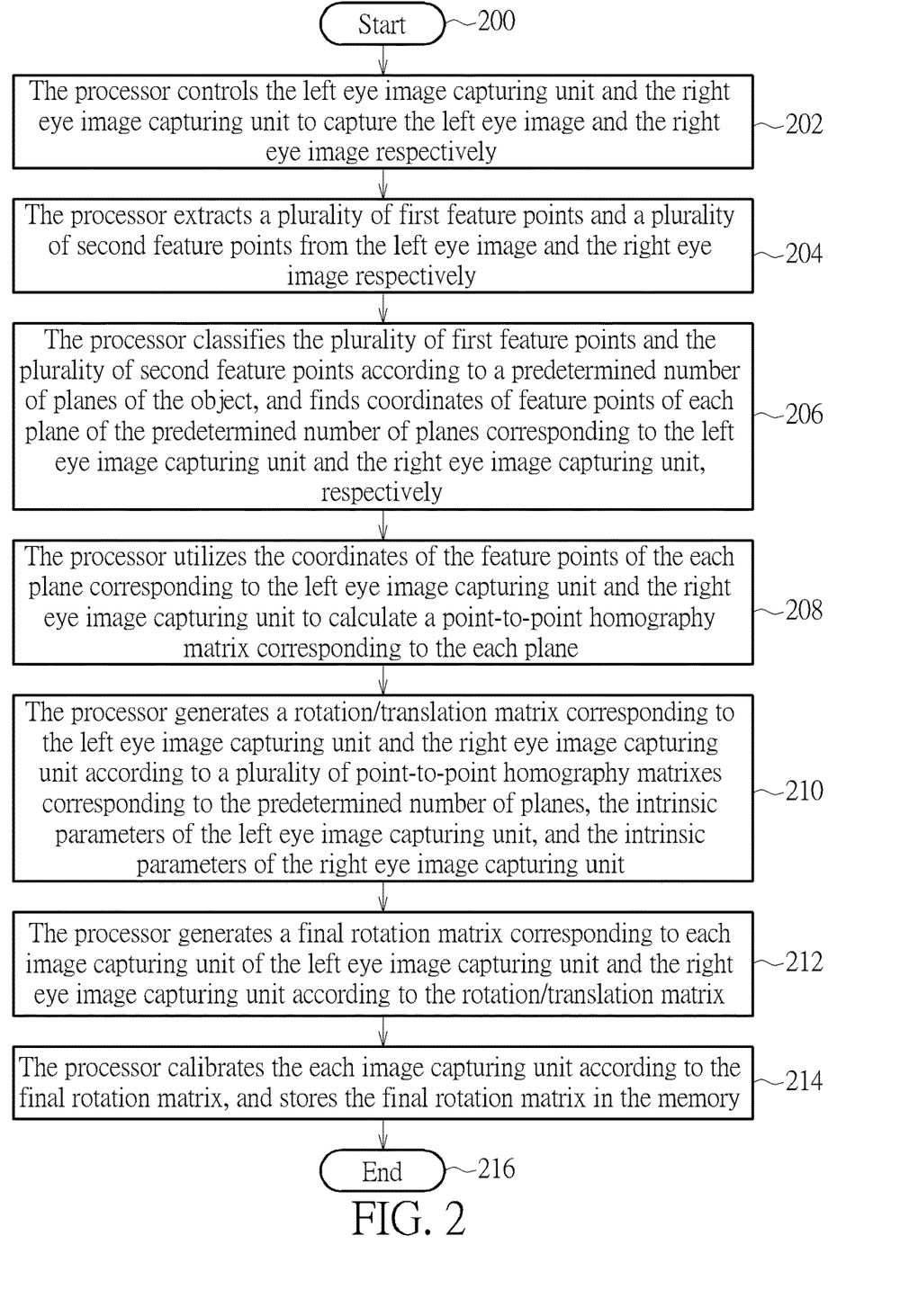
FIG. 2 is a flowchart illustrating a calibration method of an image device according to a second embodiment of the present invention.
Figure 3:
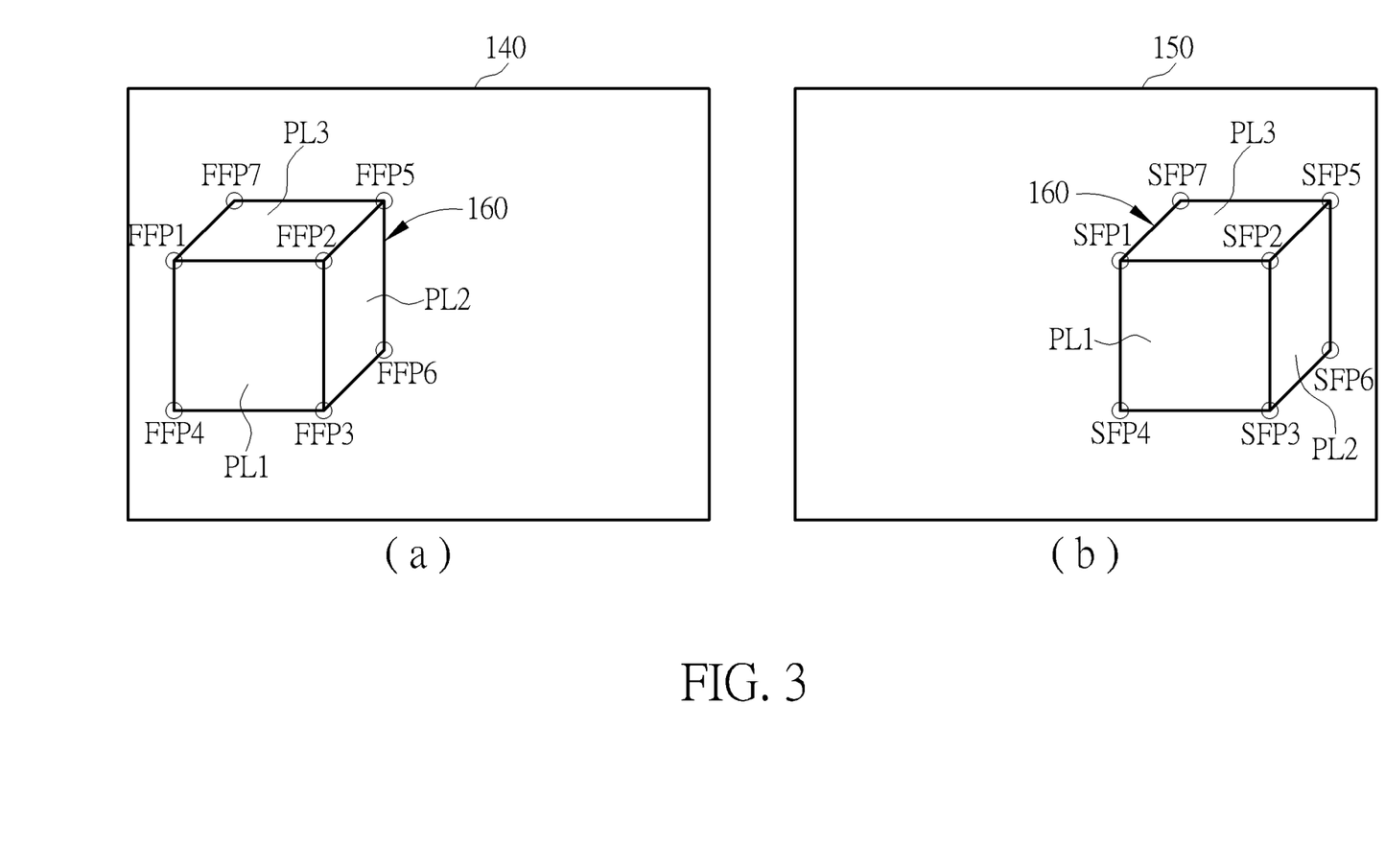
FIG. 3 is a diagram illustrating a left eye image captured by the left eye image capturing unit and a right eye image captured by the right eye image capturing unit.

Please refer to FIG. 1. FIG. 1 is a diagram illustrating an image device 100 according to a first embodiment of the present invention, wherein the image device 100 includes a left eye image capturing unit 102, a right eye image capturing unit 104, a processor 106, and a memory 108, wherein as shown in FIG. 1, the processor 106 is coupled to the left eye image capturing unit 102, the right eye image capturing unit 104, and the memory 108, and the left eye image capturing unit 102 and the right eye image capturing unit 104 are further coupled to the memory 108. In addition, intrinsic parameters of the left eye image capturing unit 102 and intrinsic parameters of the right eye image capturing unit 104 are stored in the memory 108, the intrinsic parameters of the left eye image capturing unit 102 include status of a focal length, an optical center, a lens distortion, and so on of the left eye image capturing unit 102, and the intrinsic parameters of the right eye image capturing unit 104 include status of a focal length, an optical center, a lens distortion, and so on of the right eye image capturing unit 104. In addition, the present invention is not limited to the image device 100 only including the left eye image capturing unit 102 and the right eye image capturing unit 104. That is, the image device 100 can include more than two image capturing units. In addition, please refer to FIGS. 2-3. FIG. 2 is a flowchart illustrating a calibration method of an image device according to a second embodiment of the present invention, FIG. 3(a) is a diagram illustrating a left eye image 140 captured by the left eye image capturing unit 102, and FIG. 3(b) is a diagram illustrating a right eye image 150 captured by the right eye image capturing unit 104. In addition, one of ordinary skill in the art should know each image capturing unit of the left eye image capturing unit 102 and the right eye image capturing unit 104 at least includes a lens and an image sensor (e.g. a charge-coupled equipment (CCD) image sensor or a complementary metal-oxide-semiconductor image sensor). In addition, the calibration method in FIG. 2 is illustrated using the image device 100 in FIG. 1. Detailed steps are as follows:

Step 200: Start.

Step 202: The processor 106 controls the left eye image capturing unit 102 and the right eye image capturing unit 104 to capture the left eye image 140 and the right eye image 150 respectively, wherein the left eye image 140 corresponds to the right eye image 150, and the left eye image 140 and the right eye image 150 include an object 160.

Step 204: The processor 106 extracts a plurality of first feature points and a plurality of second feature points from the left eye image 140 and the right eye image 150 respectively, wherein the plurality of first feature points correspond to the plurality of second feature points.

Step 206: The processor 106 classifies the plurality of first feature points and the plurality of second feature points according to a predetermined number of planes of the object 160, and finds coordinates of feature points of each plane of the predetermined number of planes corresponding to the left eye image capturing unit 102 and the right eye image capturing unit 104, respectively.

Step 208: The processor 106 utilizes the coordinates of the feature points of the each plane corresponding to the left eye image capturing unit 102 and the right eye image capturing unit 104 to calculate a point-to-point homography matrix corresponding to the each plane.

Step 210: The processor 106 generates a rotation/translation matrix corresponding to the left eye image capturing unit 102 and the right eye image capturing unit 104 according to a plurality of point-to-point homography matrixes corresponding to the predetermined number of planes, the intrinsic parameters of the left eye image capturing unit 102, and the intrinsic parameters of the right eye image capturing unit 104.

Step 212: The processor 106 generates a final rotation matrix corresponding to each image capturing unit of the left eye image capturing unit 102 and the right eye image capturing unit 104 according to the rotation/translation matrix.

Step 214: The processor 106 calibrates the each image capturing unit according to the final rotation matrix, and stores the final rotation matrix in the memory 108.

Step 216: End.

After the image device 100 is shipped and the image device 100 operates for a period of time, mechanism and optical accuracy of the image device 100 may be reduced due to a usage environment, a usage way, or a usage condition of the image device 100, resulting in a mechanism between the left eye image capturing unit 102 and the right eye image capturing unit 104 of the image device 100 being not an original calibration state before the image device 100 is shipped. For example, a distance between the left eye image capturing unit 102 and the right eye image capturing unit 104, a relative rotation angle between the left eye image capturing unit 102 and the right eye image capturing unit 104, a relative skew between the left eye image capturing unit 102 and the right eye image capturing unit 104, and so on are not original calibration states before the image device 100 is shipped. Therefore, the left eye image capturing unit 102 and the right eye image capturing unit 104 need to be calibrated to compensate a shift of the mechanism between the left eye image capturing unit 102 and the right eye image capturing unit 104. In Step 202, the processor 106 can control the left eye image capturing unit 102 and the right eye image capturing unit 104 to execute image capturing operation on the object 160 to generate the left eye image 140 and the right eye image 150 respectively, wherein the processor 106 can first execute the distortion correction on the left eye image 140 and the right eye image 150 to make the left eye image 140 and the right eye image 150 not have distortion. But, the present invention is not limited to the left eye image 140 and the right eye image 150 only including the object 160. Therefore, in another embodiment of the present invention, the processor 106 can control the left eye image capturing unit 102 and the right eye image capturing unit 104 to simultaneously execute the image capturing operation on a plurality of objects included in the left eye image 140 and the right eye image 150 to generate corresponding images. In Step 204, as shown in FIG. 3(a), the processor 106 can extract a plurality of first feature points (e.g. first feature points FFP1-FFP7) of the object 160 from the left eye image 140, wherein the first feature points FFP1-FFP4 are located on a plane PL1, the first feature points FFP2, FFP3, FFP5, FFP6 are located on a plane PL2, the first feature points FFP1, FFP2, FFP5, FFP7 are located on a plane PL3, and the first feature points FFP1-FFP7 are only used for illustrating the present invention. That is, the present invention is not limited to the first feature points FFP1-FFP7. In addition, the processor 106 can also extract a plurality of second feature points (e.g. second feature points SFP1-SFP7) of the object 160 from the right eye image 150, wherein the second feature points SFP1-SFP4 are located on the plane PL1, the second feature points SFP2, SFP3, SFP5, SFP6 are located on the plane PL2, the second feature points SFP1, SFP2, SFP5, SFP7 are located on the plane PL3, and the second feature points SFP1-SFP7 are just used for illustrating the present invention. That is, the present invention is also not limited to the second feature points SFP1-SFP7.

In Step 206, the processor 106 can classify the first feature points FFP1-FFP7 and the second feature points SFP1-SFP7 according to the planes PL1-PL3 (wherein the planes PL1-PL3 are a predetermined number of planes of the object 160, and the predetermined number is equal to 3), and find coordinates of feature points of each plane of the planes PL1-PL3 corresponding to the left eye image capturing unit 102 and the right eye image capturing unit 104. For example, the processor 106 can find coordinates of feature points (that is, the first feature points FFP1-FFP4 and the second feature points SFP1-SFP4) of the plane PL1 corresponding to the left eye image capturing unit 102 and the right eye image capturing unit 104, coordinates of feature points (that is, the first feature points FFP2, FFP3, FFP5, FFP6 and the second feature points SFP2, SFP3, SFP5, SFP6) of the plane PL2 corresponding to the left eye image capturing unit 102 and the right eye image capturing unit 104, and coordinates of feature points (that is, the first feature points FFP1, FFP2, FFP5, FFP7 and the second feature points SFP1, SFP2, SFP5, SFP7) of the plane PL3 corresponding to the left eye image capturing unit 102 and the right eye image capturing unit 104, respectively. In addition, the present invention is not limited to the predetermined number being 3. In Step 208, taking the plane PL1 as an example, the processor 106 can calculate a point-to-point homography matrix H1 corresponding to the plane PL1 according to the coordinates of the first feature points FFP1-FFP4 of the plane PL1 corresponding to the left eye image capturing unit 102, the coordinates of the second feature points SFP1-SFP4 of the plane PL1 corresponding to the right eye image capturing unit 104, and equation (1).

$$\begin{bmatrix} x \\ y \\ 1 \end{bmatrix} = \underbrace{\begin{bmatrix} h11 & h12 & h13 \\ h21 & h22 & h23 \\ h31 & h32 & h33 \end{bmatrix}}_{H1} \begin{bmatrix} X \\ Y \\ 1 \end{bmatrix} \quad (1)$$

As shown in equation (1), the coordinates of the first feature points FFP1-FFP4 corresponding to the left eye image capturing unit 102 are substituted into (X, Y) respectively and the coordinates of the second feature points SFP1-SPF4 corresponding to the right eye image capturing unit 104 are substituted into (x, y) respectively to obtain the point-to-point homography matrix H1. In addition, the processor 106 can calculate a point-to-point homography matrix H2 corresponding to the plane PL2, and a point-to-point homography matrix H3 corresponding to the plane PL3 according to the above-mentioned method generating the point-to-point homography matrix H1.

Before executing Step 210, the processor 106 can get the intrinsic parameters of the left eye image capturing unit 102 and the intrinsic parameters of the right eye image capturing unit 104 from the memory 108. In addition, in another embodiment of the present invention, the intrinsic parameters of the left eye image capturing unit 102 and the intrinsic parameters of the right eye image capturing unit 104 are stored in a server on the Internet, so the processor 106 can get the intrinsic parameters of the left eye image capturing unit 102 and the intrinsic parameters of the right eye image capturing unit 104 from the server. In Step 210, after the point-to-point homography matrixes H1-H3 are generated, the processor 106 can generate a rotation/translation matrix [R|t] according to the intrinsic parameters of the left eye image capturing unit 102, the intrinsic parameters of the right eye image capturing unit 104, and the point-to-point homography matrixes H1-H3, wherein R is an element of the rotation/translation matrix [R|t] corresponding to rotation, R represents a rotation relationship between an optical axis of the left eye image capturing unit 102 and an optical axis of the right eye image capturing unit 104, t is an element of the rotation/translation matrix [R|t] corresponding to translation, and t represents a direction of the optical center of the left eye image capturing unit 102 and a direction of the optical center of the right eye image capturing unit 104. In addition, the rotation/translation matrix [R|t] is well-known to one of ordinary skill in the art, so further description thereof is omitted for simplicity. Ideally, the point-to-point homography matrixes H1-H3 can correspond to the rotation/translation matrix [R|t] together. However, in fact, the point-to-point homography matrixes H1-H3 may correspond to three rotation/translation matrixes [R|t]$_1$-[R|t]$_3$ due to errors, wherein the rotation/translation matrix [R|t]$_1$ corresponds to the plane PL1, the rotation/translation matrix [R|t]$_2$ corresponds to the plane PL2, and the rotation/translation matrix [R|t]$_3$ corresponds to the plane PL3. Meanwhile, in one embodiment of the present invention, the processor 106 can average corresponding elements of the rotation/translation matrix [R|t]$_1$-[R|t]$_3$ to generate an equivalent rotation/translation matrix. In addition, in another embodiment of the present invention, the processor 106 can generate another equivalent rotation/translation matrix according to medians of the corresponding elements of the rotation/translation matrix [R|t]$_1$-[R|t]$_3$. In addition, one of ordinary skill in the art can utilize many well-known outlier elimination algorithms (e.g. random sample consensus (RANSAC) algorithm) to remove point-to-point homography matrixes with greater differences.

In Step 212, because one of ordinary skill in the art should know the rotation/translation matrix [R|t], one of ordinary skill in the art can utilize the processor 106 to generate a final rotation matrix [R]$_L$ corresponding to the left eye image capturing unit 102 and a final rotation matrix [R]$_R$ corresponding to the right eye image capturing unit 104 according to a translation vector [t] (composed of elements of the rotation/translation matrix [R|t] corresponding to translation) of the rotation/translation matrix [R|t].

In Step 214, after the processor 106 generates the final rotation matrix [R]$_R$ and the final rotation matrix [R]$_L$, the processor 106 can store the final rotation matrix [R]$_R$ and the final rotation matrix [R]$_L$ in the memory 108, and the processor 106 can calibrate the left eye image capturing unit 102 according to the final rotation matrix [R]$_L$ and calibrate the right eye image capturing unit 104 according to the final rotation matrix [R]$_R$. In one embodiment of the present invention, the processor 106 calibrating the left eye image capturing unit 102 and the right eye image capturing unit 104 means that the processor 106 adjusts the shift of the mechanism between the left eye image capturing unit 102 and the right eye image capturing unit 104 according to the final rotation matrix [R]$_L$ and the final rotation matrix [R]$_R$. After the processor 106 adjusts the shift of the mechanism between the left eye image capturing unit 102 and the right eye image capturing unit 104, a plurality of first feature points (e.g. the first feature points FFP1-FFP7) of a left eye image captured by the left eye image capturing unit 102 align a plurality of second feature points (e.g. the second feature points SFP1-SFP7) of a right eye image captured by the right eye image capturing unit 104 (e.g. row alignment between the left eye image and the right eye image), wherein the row alignment means that on an image plane, each of the plurality of first feature points of the left eye image and a corresponding feature point of the plurality of second feature points of the right eye image are located on the same Y axis (when the left eye image capturing unit 102 and the right eye image capturing unit 104 are placed on the same horizontal placement) or the same X axis (when the left eye image capturing unit 102 and the right eye image capturing unit 104 are placed on the same vertical placement). That is, after the processor 106 adjusts the shift of the mechanism between the left eye image capturing unit 102 and the right eye image capturing unit 104, each horizontal scan line of left eye images of the left eye image capturing unit 102 (or right eye images of the right eye image capturing unit 104) should be parallel to a baseline between the left eye image capturing unit 102 and the right eye image capturing unit 104. In addition, after the processor 106 adjusts the shift of the mechanism between the left eye image capturing unit 102 and the right eye image capturing unit 104, the image device 100 operates the left eye image capturing unit 102 and the right eye image capturing unit 104 according to an adjusted mechanism between the left eye image capturing unit 102 and the right eye image capturing unit 104.

In addition, in another embodiment of the present invention, in Step 210, the processor 106 first generates final rotation matrixes [R]$_{R1}$-[R]$_{R3}$ and final rotation matrixes [R]$_{L1}$-[R]$_{L3}$ according to the rotation/translation matrixes [R|t]$_1$-[R|t]$_3$ respectively, rather than executing average, taking median, and outlier elimination algorithm on the rotation/translation matrix [R|t]$_1$-[R|t]$_3$. Then, in Step 212, the processor 106 executes average, taking median, and outlier elimination algorithm on the final rotation matrix [R]$_{R1}$-[R]$_{R3}$ and the final rotation matrix [R]$_{L1}$-[R]$_{L3}$, respectively.

In addition, in another embodiment of the present invention, the processor 106 can neglect Step 210. That is, in Step 212, the processor 106 can generate the final rotation matrix [R]$_L$ corresponding to the left eye image capturing unit 102 and the final rotation matrix [R]$_R$ corresponding to the right eye image capturing unit 104 directly according to the intrinsic parameters of the left eye image capturing unit 102, the intrinsic parameters of the right eye image capturing unit 104, and the point-to-point homography matrixes H1-H3 generated from Step 208. That is, in another embodiment of the present invention, the processor 106 can generate the final rotation matrix [R]$_L$ corresponding to the left eye image capturing unit 102 and the final rotation matrix [R]$_R$ corresponding to the right eye image capturing unit 104 not through the rotation/translation matrix [R|t].

However, in another embodiment of the present invention, the processor 106 calibrating the left eye image capturing unit 102 and the right eye image capturing unit 104 means that the processor 106 can execute image rectification on the left eye image capturing unit 102 and the right eye image capturing unit 104 according to the final rotation matrix [R]$_L$ and the final rotation matrix [R]$_R$ respectively. That is, because the usage environment, the usage way, or the usage condition of the image device 100 make the mechanism between the left eye image capturing unit 102 and the right eye image capturing unit 104 shift, so the processor 106 can compensate (i.e. correct) left eye images captured by the left eye image capturing unit 102 and right eye images captured by the right eye image capturing unit 104 respectively according to the final rotation matrix [R]$_L$ and the final rotation matrix [R]$_R$ to compensate the shift of the mechanism between the left eye image capturing unit 102 and the right eye image capturing unit 104. That is, meanwhile, the processor 106 does not adjust the shift of the mechanism between the left eye image capturing unit 102 and the right eye image capturing unit 104.

In addition, one of ordinary skill in the art can clearly realize functions of the processor 106 through the above-mentioned corresponding descriptions of the processor 106, so one of ordinary skill in the art can easily implement the processor 106 through a field programmable gate array (FPGA) with the above-mentioned functions of the processor 106, or an application-specific integrated circuit (ASIC) with the above-mentioned functions of the processor 106, or a software module with the above-mentioned functions of the processor 106, or an analog integrated circuit with the above-mentioned functions of the processor 106, so further description of a corresponding structure of the processor 106 is omitted for simplicity.

In addition, after the processor 106 calibrates the left eye image capturing unit 102 according to the final rotation matrix $[R]_L$, and calibrates the right eye image capturing unit 104 according to the final rotation matrix $[R]_R$, if each horizontal scan line of the left eye images of the left eye image capturing unit 102 (or the right eye images of the right eye image capturing unit 104) is still not parallel to the baseline between the left eye image capturing unit 102 and the right eye image capturing unit 104, the processor 106 can continuously execute Steps 206-214 on planes of the object 160 different from the planes PL1-PL3 until the each horizontal scan line of the left eye images of the left eye image capturing unit 102 (or the right eye images of the right eye image capturing unit 104) is parallel to the baseline between the left eye image capturing unit 102 and the right eye image capturing unit 104.

Figure 4:
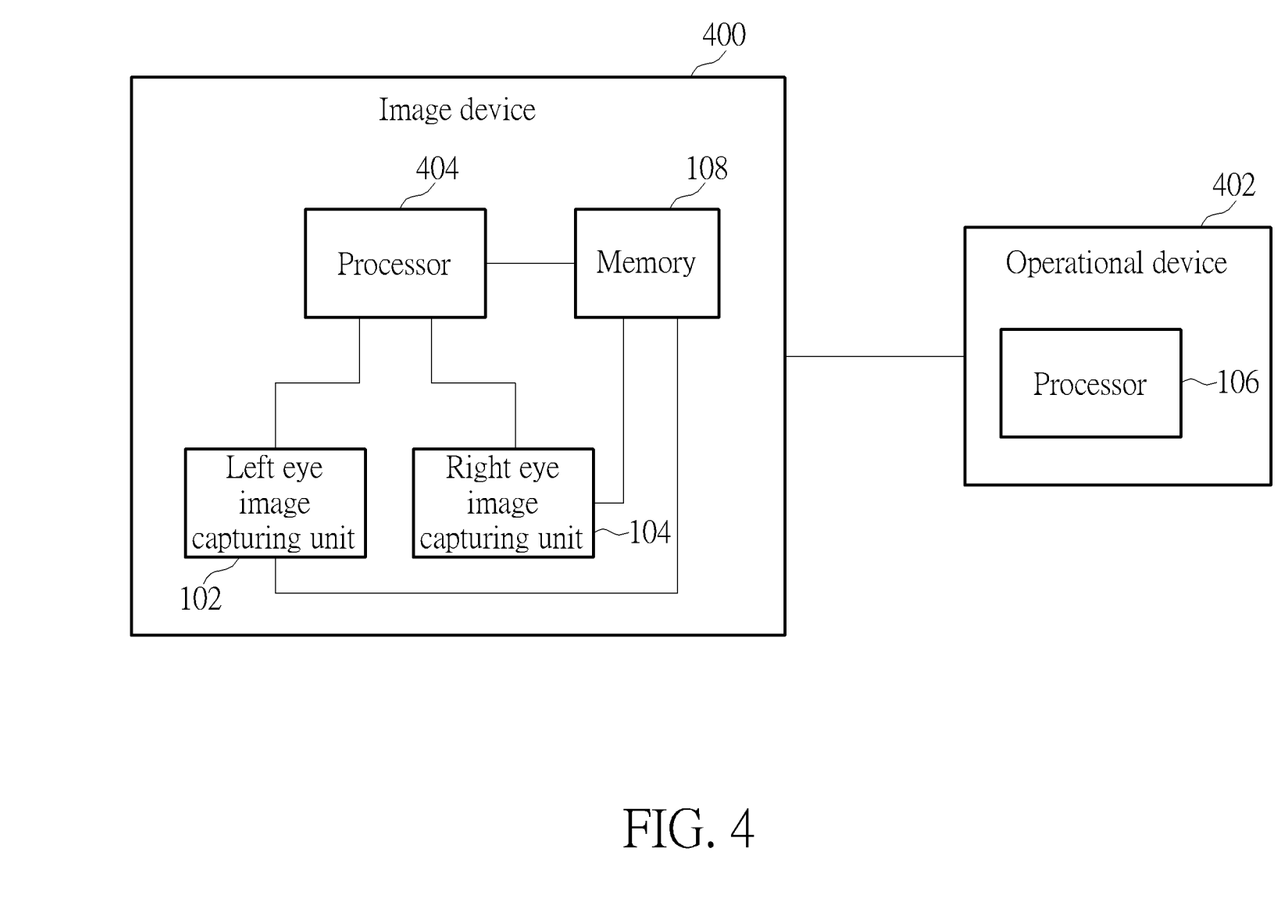
FIG. 4 is a diagram illustrating an image device and an operational device according to a third embodiment of the present invention.

In addition, as shown in FIG. 4, in a third embodiment of the present invention, the above-mentioned processor 106 is included in an operational device 402 (e.g. a computer, a smart phone, a cloud system, or a tablet computer) outside an image device 400. As shown in FIG. 4, a processor 404 for controlling the image device 400 is included in the image device 400, so the processor 404 can transmit left eye images captured by the left eye image capturing unit 102 and right eye images captured by the right eye image capturing unit 104 to the operational device 402 through a wired method. But, in another embodiment of the present invention, the processor 404 transmits the left eye images captured by the left eye image capturing unit 102 and the right eye images captured by the right eye image capturing unit 104 to the operational device 402 through a wireless method. Therefore, after the operational device 402 receives the left eye images captured by the left eye image capturing unit 102 and the right eye images captured by the right eye image capturing unit 104, the processor 106 of the operational device 402 can calibrate the left eye image capturing unit 102 and the right eye image capturing unit 104 of the image device 400 according to the calibration method shown in FIG. 2. In addition, operational principles of the memory 108 of the image device 400 can be referred to the above-mentioned corresponding descriptions, so further description thereof is omitted for simplicity. In addition, in another embodiment of the present invention, the image device 400 and the operational device 402 can form a system with calibration function, wherein operational principles of the system can be referred to the above-mentioned corresponding descriptions, so further description thereof is omitted for simplicity.

Figure 5:
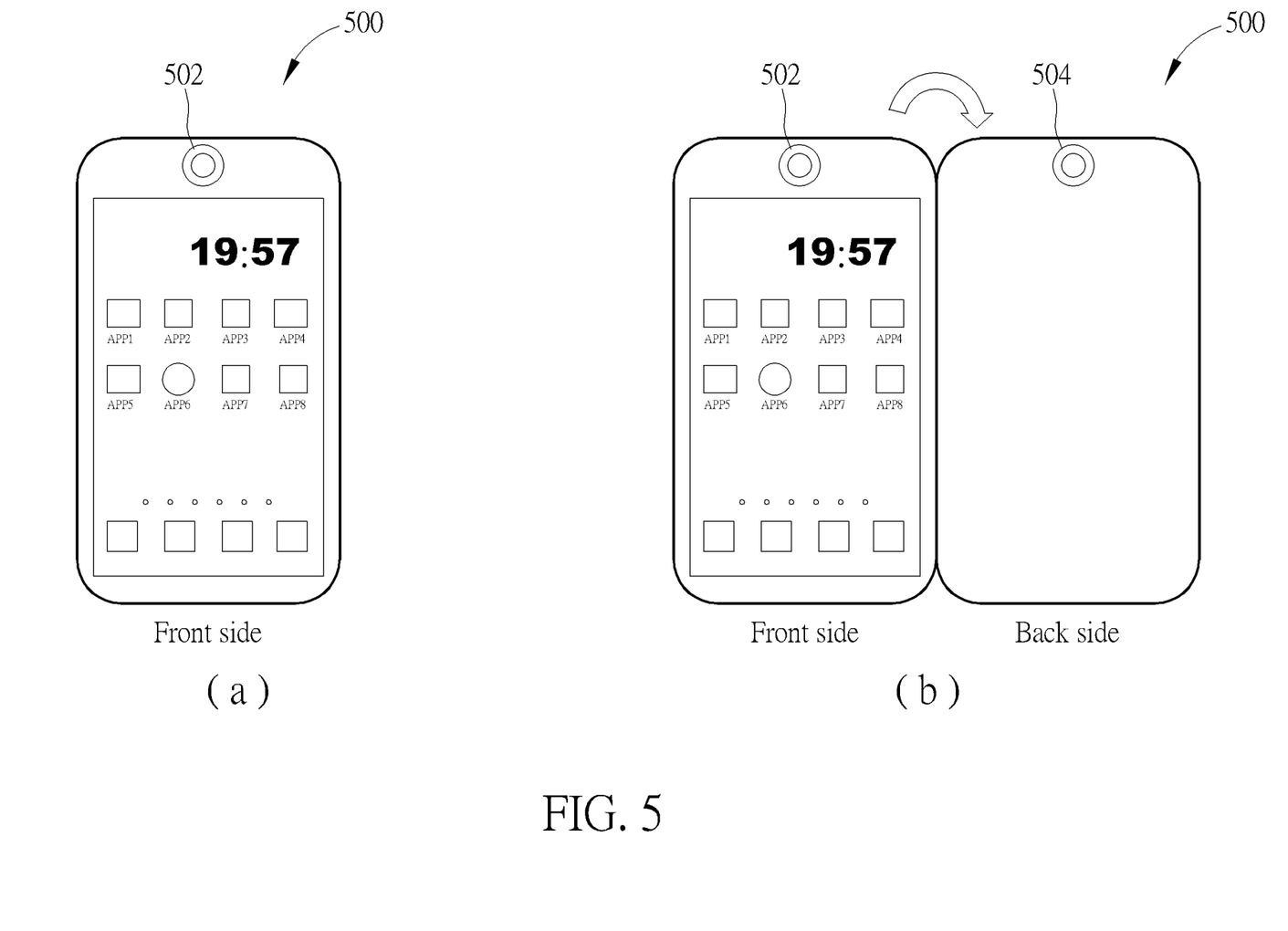
FIG. 5 is a diagram illustrating a front side of the image device and the back side of the image device and the front side of the image device being toward the same direction image device.
Figure 6:
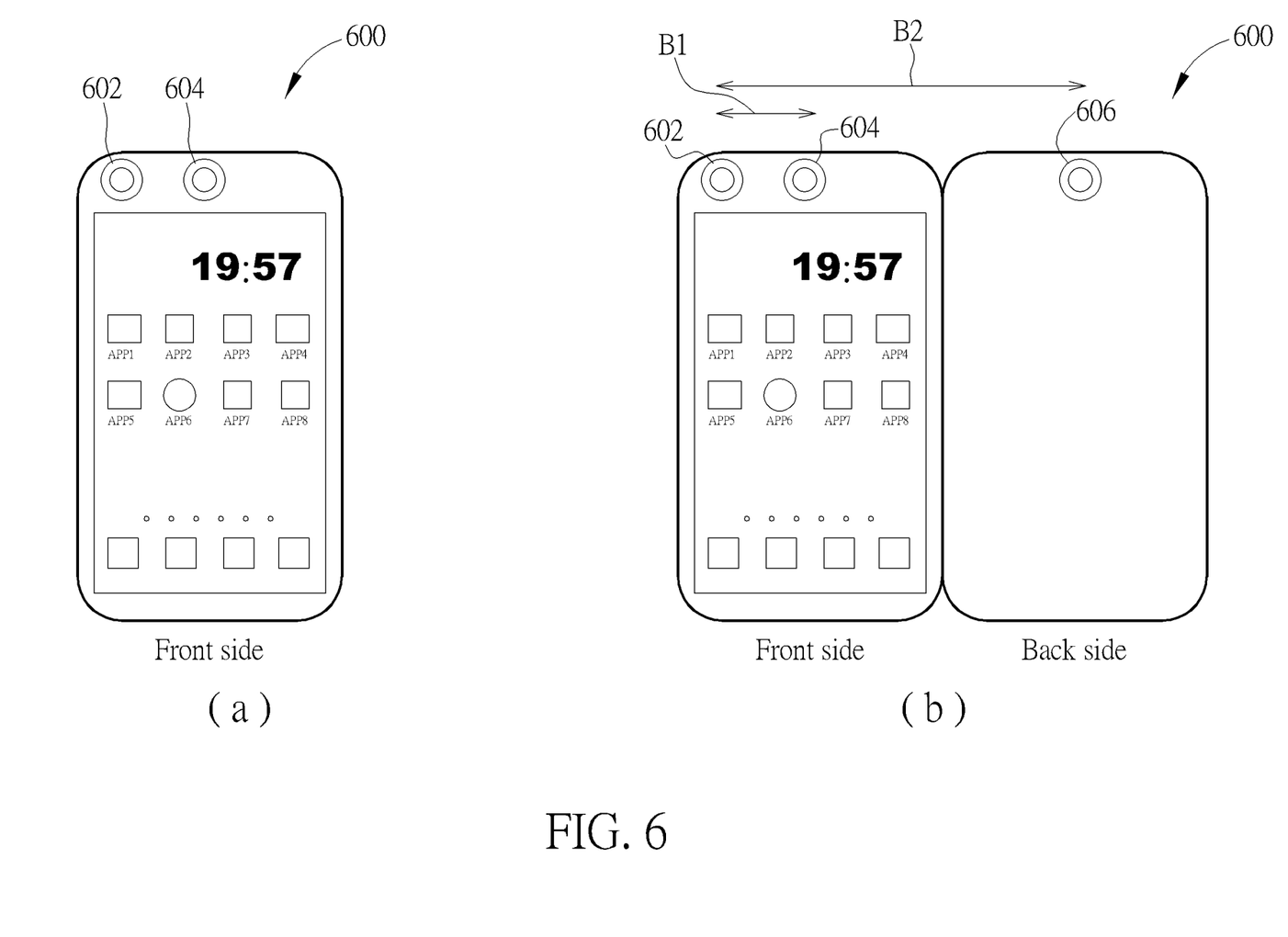
FIG. 6 is a diagram illustrating a front side of the image device and the back side of the image device and the front side of the image device being toward the same direction image device.
Figure 7:
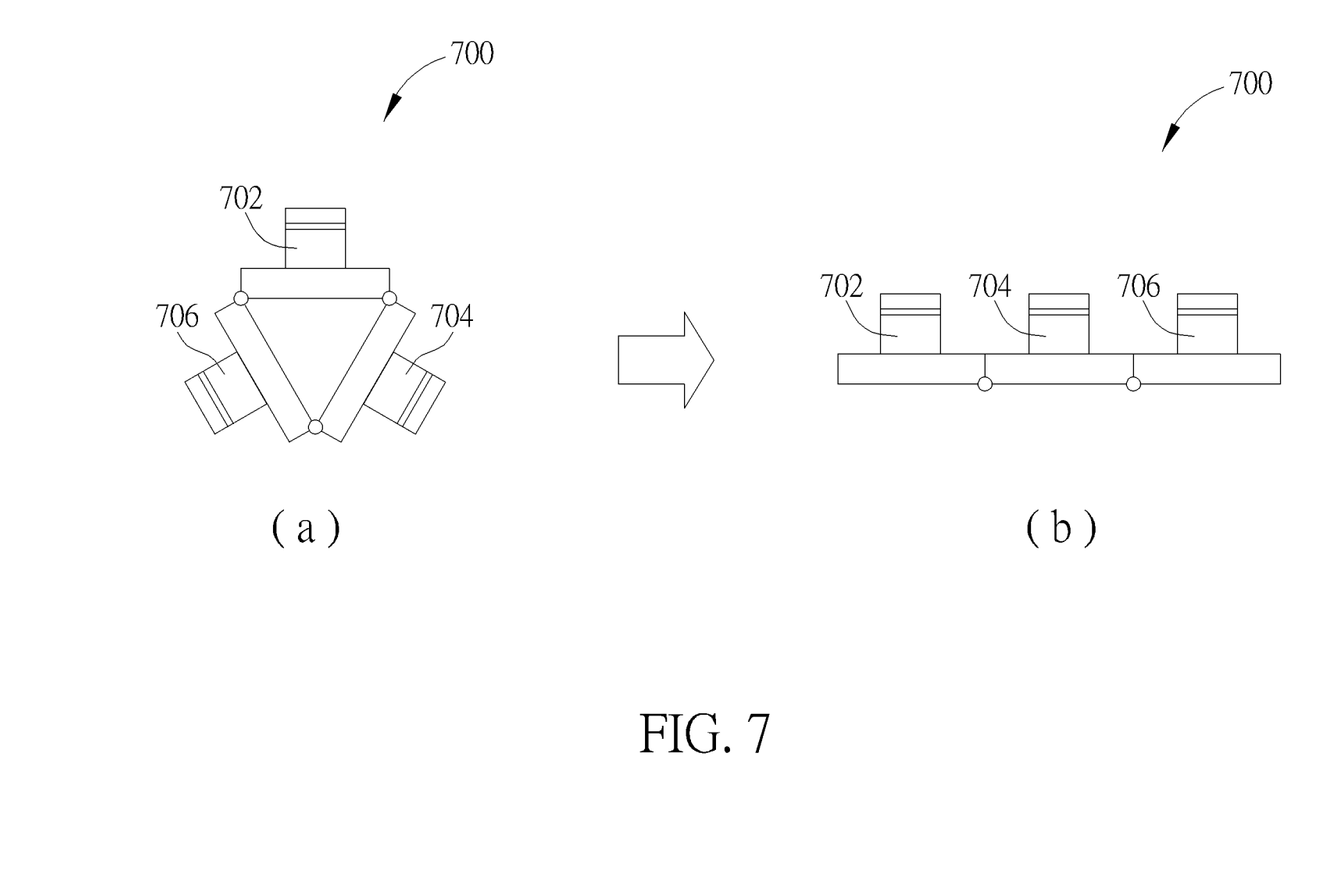
FIG. 7 is a diagram illustrating the image device with three image capturing units and the three image capturing units of the image device being expanded.

In addition, please refer to FIG. 5(a). FIG. 5(a) is a diagram illustrating a front side of an image device 500 with image capturing units 502, 504. As shown in FIG. 5(a), because the image capturing unit 502 is installed on the front side of the image device 500 and the image capturing unit 504 is installed on a back side of the image device 500, FIG. 5(a) does not show the image capturing unit 504. When the back side of the image device 500 and the front side of the image device 500 are toward the same direction (as shown in FIG. 5(b)), the image device 500 can act as a stereo camera or a depth camera. But, when the back side of the image device 500 and the front side of the image device 500 are toward the same direction, a mechanism between the image capturing unit 502 and the image capturing unit 504 may be shifted because a mechanism between the back side of the image device 500 and the front side of the image device 500 is not precise enough (that is, when the back side of the image device 500 and the front side of the image device 500 are toward the same direction, a current state of the mechanism between the image capturing unit 502 and the image capturing unit 504 may not be a previous state of the mechanism between the image capturing unit 502 and the image capturing unit 504), so the above-mentioned calibration method of the present invention or the prior art can be applied to calibrating a shift of the mechanism between the image capturing unit 502 and the image capturing unit 504. Similarly, the above-mentioned calibration method of the present invention or the prior art can also be applied to calibrating an image device 600 (as shown in FIGS. 6(a), 6(b)) with image capturing units 602, 604, 606, wherein the image capturing units 602, 604 form a first image capturing group (corresponding to a first baseline B1), and the image capturing units 602, 606 form a second image capturing group (corresponding to a second baseline B2). In addition, please refer to FIG. 7(a). FIG. 7(a) is a diagram illustrating an image device 700 with image capturing units 702, 704, 706, wherein the image capturing units 702, 704, 706 are fisheye lens image capturing units or non-fisheye lens image capturing units. As shown in FIG. 7(a), when the image capturing units 702, 704, 706 are not expanded, the image device 700 can act as a 360 degree panorama camera. That is, the image device 700 can utilize images captured by the image capturing units 702, 704, 706 to generate a 360 degree panorama image. In addition, in another embodiment of the present invention, the image device 700 is flexible. That is, when the image device 700 is flexible and the image capturing units 702, 704, 706 are not expanded, a connection between each two adjacent image capturing units of the image capturing units 702, 704, 706 does not have an acute angle as shown in FIG. 7(a). That is, the connection between the each two adjacent image capturing units is a smooth region with radians.

As shown in FIG. 7(b), when the image capturing units 702, 704, 706 are expanded, the image device 700 can act as a stereo camera or a depth camera. Therefore, when the image capturing units 702, 704, 706 are not expanded, one of ordinary skill in the art can utilize a panorama image calibration method provided by the prior art to calibrate the image device 700; when the image capturing units 702, 704, 706 are expanded, the above-mentioned calibration method of the present invention or the prior art can be applied to calibrating a shift of a mechanism among the image capturing units 702, 704, 706. In addition, the present invention is not limited to the image device 700 including the image capturing units 702, 704, 706. That is, the image device 700 can only include two fisheye lens image capturing units, wherein when the two fisheye lens image capturing units are back-to-back, the image device 700 can act as a 360 degree panorama camera, and when the two fisheye lens image capturing units are toward the same direction, the image device 700 can act as a stereo camera or a depth camera. In addition, the image device 700 can also include at least four image capturing units (or at least four fisheye lens image capturing units), wherein the at least four image capturing units are not expanded, the image device 700 can act as a 360 degree panorama camera, and when the at least four image capturing units are expanded, the image device 700 can act as a stereo camera or a depth camera. Therefore, as long as an image device acts as a stereo camera or a depth camera, and a shift exists in a mechanism between image capturing units included in the image device, the calibration method provided by the present invention can be applied to calibrating the image device. That is, the calibration method provided by the present invention is not limited to calibrating mechanisms of FIG. 5(b), FIG. 6(b), and FIG. 7(b).

To sum up, the calibration method and the related image device and the operational device thereof utilize the processor to extract a plurality of feature points of a predetermined number of planes of an object from corresponding images captured by the image capturing units of the image device, and utilize the processor to classify the plurality of feature points according to each plane of the predetermined number of planes to calibrate the image device, so the present invention is different from a method of the prior art directly utilizing multiple feature points of the object (that is, not classifying the multiple feature points) to calibrate the image device. Therefore, compared to the prior art, even if differences between multiple distances between the multiple feature points and the image device are smaller, the present invention can still execute robust calibration on the image capturing units of the image device to generate a well calibration result.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A calibration method of an image device, wherein the image device comprises at least two image capturing units, the calibration method comprising:
    the at least two image capturing units capturing at least two corresponding images;
    a processor executing distortion correction on the at least two corresponding images;
    the processor extracting a plurality of feature points of a predetermined number of planes of an object from the at least two corresponding images;
    the processor classifying the plurality of feature points according to each plane of the predetermined number of planes to accordingly calculate a point-to-point homography matrix corresponding to the each plane respectively to generate a rotation/translation matrix corresponding to the at least two image capturing units;
    the processor generating a final rotation matrix corresponding to each image capturing unit of the at least two image capturing units according to the rotation/translation matrix; and
    the processor storing the final rotation matrix in a memory and calibrating the each image capturing unit according to the final rotation matrix.

2. The calibration method of claim 1, wherein the processor accordingly calculating the point-to-point homography matrix corresponding to the each plane respectively to generate the rotation/translation matrix comprises:
    the processor utilizing coordinates of feature points of the each plane corresponding to the at least two image capturing units to calculate the point-to-point homography matrix corresponding to the each plane; and
    the processor generating the rotation/translation matrix according to a plurality of point-to-point homography matrixes corresponding to the predetermined number of planes and intrinsic parameters of the at least two image capturing units.

3. The calibration method of claim 2, wherein the processor gets the intrinsic parameters of the at least two image capturing units from a server on the Internet.

4. The calibration method of claim 2, wherein the image device further includes the memory, and the processor gets the intrinsic parameters of the at least two image capturing units from the memory.

5. The calibration method of claim 1, wherein the processor calibrating the each image capturing unit according to the final rotation matrix is the processor adjusting a shift of a mechanism between the at least two image capturing units according to the final rotation matrix.

6. The calibration method of claim 1, wherein the processor calibrating the each image capturing unit according to the final rotation matrix is the processor compensating each image captured by the each image capturing unit according to the final rotation matrix.

7. The calibration method of claim 1, wherein after the processor calibrates the each image capturing unit according to the final rotation matrix, each horizontal scan line of images captured by the each image capturing unit parallels a baseline between the at least two image capturing units.

8. The calibration method of claim 1, wherein the processor is comprised in the image device or in an operational device outside the image device.

9. An image device with calibration function, comprising:
    at least two image capturing units capturing at least two corresponding images; and
    a processor executing distortion correction on the at least two corresponding images, extracting a plurality of feature points of a predetermined number of planes of an object from the at least two corresponding images, classifying the plurality of feature points according to each plane of the predetermined number of planes to accordingly calculate a point-to-point homography matrix corresponding to the each plane respectively to generate a rotation/translation matrix corresponding to the at least two image capturing units, generating a final rotation matrix corresponding to each image capturing unit of the at least two image capturing units according to the rotation/translation matrix, and calibrating the each image capturing unit according to the final rotation matrix.

10. The image device of claim 9, further comprising:
    a memory storing the intrinsic parameters of the at least two image capturing units, wherein the processor gets the intrinsic parameters of the at least two image capturing units from the memory.

11. The image device of claim 9, wherein the processor gets the intrinsic parameters of the at least two image capturing units from a server on the Internet.

12. The image device of claim 9, wherein the processor calibrating the each image capturing unit according to the final rotation matrix is the processor adjusting a shift of a mechanism between the at least two image capturing units according to the final rotation matrix.

13. The image device of claim 9, wherein the processor calibrating the each image capturing unit according to the final rotation matrix is the processor compensating each image captured by the each image capturing unit according to the final rotation matrix.

14. The image device of claim 9, wherein the at least two image capturing units comprises a left eye image capturing unit and a right eye image capturing unit, and the at least two corresponding images comprises a left eye image and a right eye image.

15. The image device of claim 9, wherein after the processor calibrates the each image capturing unit according to the final rotation matrix, each horizontal scan line of images captured by the each image capturing unit parallels a baseline between the at least two image capturing units.

16. An operational device with calibration function, comprising:
a processor executing distortion correction on at least two corresponding images captured by an image device, extracting a plurality of feature points of a predetermined number of planes of an object from the at least two corresponding images, classifying the plurality of feature points according to each plane of the predetermined number of planes to accordingly calculate a point-to-point homography matrix corresponding to the each plane respectively to generate a rotation/translation matrix corresponding to the at least two image capturing units, generating a final rotation matrix corresponding to each image capturing unit of the at least two image capturing units according to the rotation/translation matrix, and calibrating the each image capturing unit according to the final rotation matrix.

17. The operational device of claim 16, wherein the processor accordingly calculating the point-to-point homography matrix corresponding to the each plane respectively to generate the rotation/translation matrix comprises:
the processor utilizing coordinates of feature points of the each plane corresponding to the at least two image capturing units to calculate the point-to-point homography matrix corresponding to the each plane; and
the processor generating the rotation/translation matrix according to a plurality of point-to-point homography matrix corresponding to the predetermined number of planes and intrinsic parameters of the at least two image capturing units.

18. An image device with calibration function, comprising:
at least two image capturing units capturing at least two corresponding images, wherein relative positions between the at least two image capturing units are changeable to make the at least two corresponding images be used for generating a 360 degree panorama image, or at least one depth map, or at least one stereo image; and
a processor, wherein when the at least two corresponding images are used for generating the at least one depth map or the at least one stereo image, the processor executes distortion correction on the at least two corresponding images, extracts a plurality of feature points of a predetermined number of planes of an object from the at least two corresponding images, classifies the plurality of feature points according to each plane of the predetermined number of planes to accordingly calculate a point-to-point homography matrix corresponding to the each plane respectively to generate a rotation/translation matrix corresponding to the at least two image capturing units, generates a final rotation matrix corresponding to each image capturing unit of the at least two image capturing units according to the rotation/translation matrix, and calibrates the each image capturing unit according to the final rotation matrix.

19. The image device of claim 18, wherein when the image device only comprises two image capturing units, the two image capturing units are fisheye lens image capturing units.

20. The image device of claim 18, wherein when the image device comprises at least three image capturing units, the at least three image capturing units are fisheye lens image capturing units or non-fisheye lens image capturing units.

* * * * *